Feb. 18, 1947. R. S. CURRY, JR., ET AL 2,415,813

TORQUE EXERTING MEANS FOR GYROSCOPES

Filed July 21, 1942

INVENTOR
R. S. CURRY, JR.
O. E. ESVAL
BY Herbert H. Thompson
ATTORNEY.

Patented Feb. 18, 1947

2,415,813

UNITED STATES PATENT OFFICE 2,415,813

TORQUE EXERTING MEANS FOR GYROSCOPES

Robert S. Curry, Jr., Baldwin, and Orland E. Esval, Huntington, N. Y., assignors to Sperry Gyroscope Company, Inc., Brooklyn, N. Y., a corporation of New York Application July 21, 1942, Serial No. 451,734

5 Claims. (Cl. 74—5)

This invention relates to free gyro instruments of the type given direction or north seeking properties by being slaved to a controller such as a magnetic compass or flux valve compass. More specifically, the present invention concerns a novel electromagnetic couple by which a torque is exerted about the axis of the rotor bearing case of such a gyro instrument to control the directional indication obtained from the instrument.

The primary features of the invention reside in the provided electrically effective torque exerting means for controlling the gyro instrument and in the novel combination of the respective parts of the means in the gyro instrument.

Other features and structural details of the invention will be apparent from the following description when read in connection with the accompanying drawing, wherein Fig. 1 is a side elevation of a gyro instrument constructed in accordance with the present invention with the casing shown in section.

Figure 1:
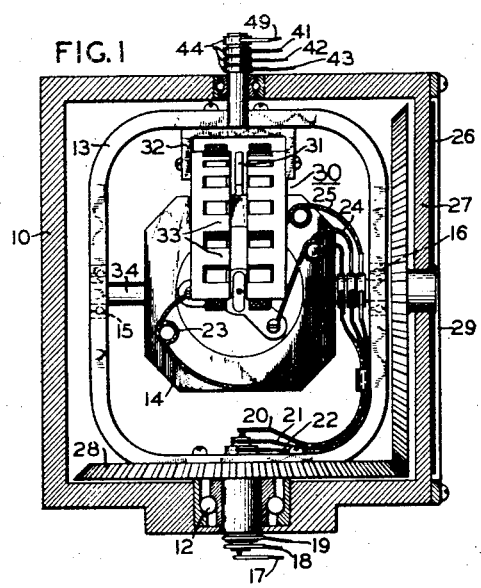

With reference to Fig. 1, a gyro instrument constructed in accordance with the present invention is shown to include a casing 10 which provides upper and lower bearings respectively indicated at 11 and 12 in which the trunnions of a vertical ring 13 are journaled. The ring 13 is a single part of the conventional gyro instrument illustratively employed in the present instance to aid in the description of the invention, the instrument further including a rotor bearing case or frame 14 which is pivotally mounted in the usual fashion between the upwardly extending arms of the ring 13. The bearings for pivotally supporting the gyro rotor bearing case 14 are respectively indicated at 15 and 16. The gyro rotor (not shown) is mounted to spin on a normally horizontal axis perpendicular to both the axis of the case 14 and the axis of the vertical ring 13 which last named element with the case serves as a universal supporting means for the rotor. Any suitable means may be provided to spin the gyro rotor such as in an electric motor (not shown) which is supplied with three phase alternating current energy from a suitable source 40, Figs. 4 and 5, by way of leads 17, 18 and 19, suitable slip rings on the vertical ring 13, leads 20, 21 and 22, suitable slip rings on the trunnion of the rotor bearing case 14 and leads 23, 24 and 25. A directional indication is obtained from the described type of gyro instrument by a compass card 26 which is rotatably mounted within the casing 10 and controlled from the meshing bevel gears 27 and 28 which last gears move with the vertical ring 13. A suitable lubber line (not shown) may be provided on the surface of the window 29 of the instrument for comparison with the indicating face of the compass card 26 by the observer in determining the indication given by the instrument. The described gyro instrument is consequently provided with vertical and horizontal axes of free support by the ring 13 and case 14, respectively.

The conventional free gyro instrument described is converted to a direction indicating gyro by slaving the same to a suitable instrument having direction indicating properties such as a magnetic compass or flux valve compass whose control over the same is exerted by the torque exerting means forming the subject matter of the present invention. In the form of the invention shown in Figs. 1 and 2, the electrically effective torque exerting means for the gyro instrument is provided by an electromagnetic couple consisting of a relatively fixed stator member designated, generally at 30 and what may be termed a rotor comprising a displaceable inductor element or vane 31.

Figure 2:
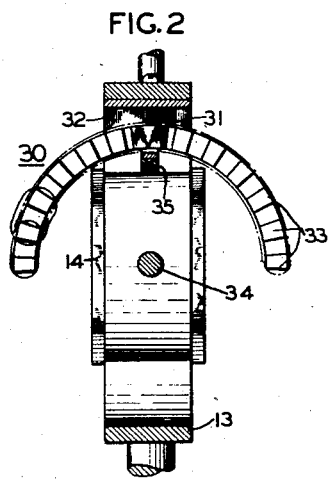
Fig. 2 is a detail side elevation of the form of torque exerting means illustrated in Fig. 1, the view being taken at right angles to the showing of the same in the previous figure.

The stator or coil member 30 is semi ring-shaped and in the form of the invention shown in Figs. 1 and 2 the same is fixedly mounted to the vertical ring by means of a bracket piece 32, the connection being made at the central part of the ring-shaped stator. The curved stator 30 includes a plurality of spaced pole pieces 33 arranged in concentric relation to the axis of the rotor bearing case as defined by trunnion 34 in Fig. 2. Further, the stator may be constructed in a U-shape so that the inductor element or fan-shaped vane 31 moves between oppositely disposed end faces of the poles 33. The coil member 30 is polyphase wound so that when energized a moving magnetic field is produced which continuously travels either clockwise or counter-clockwise, as viewed in Fig. 2, linking the inductor 31 and producing a force on the inductor in a corresponding direction. In this instance, the inductor element 31 is a conducting vane which extends from an insulating arm in a radial direction from the axis of the rotor bearing case 14, the same being fixedly mounted on the rotor bearing case by the arm 35 which is situated on the top of the case. As the pole pieces 33 extend in parallel relation to one of the axes of the frame in mutually facing relation on opposite sides of the rotor or vane 31, the force components of the torque motor along this axis or about the other of the axes of support for the frame, balance each other. Consequently, the motor is effective to exert a torque about only one of the axes of universal support provided the frame.

Figure 3:
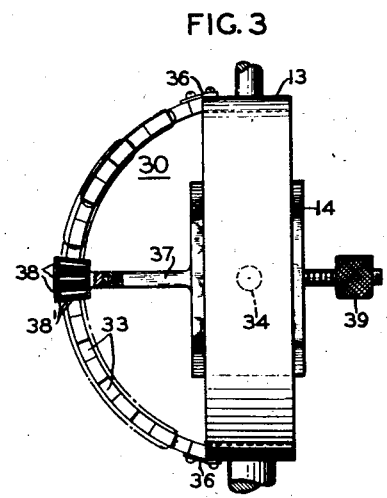
Fig. 3 is a view similar to Fig. 2 showing a modified form of the torque erecting means of the present invention.

In the modification of the invention shown in Fig. 3, the coil or stator member 30 is fixedly mounted to the ring 13 at its respective end portions by means of connection pieces 36. The inductor element, in this instance, is mounted on an arm 37 which extends from the side of the rotor bearing case 14 and is formed by a plurality of end connected spaced rods 38 which are individually positioned in a substantially radial direction with respect to the axis 34 of the rotor bearing case. The conducting bars may be embedded in contiguously arranged laminating plates as indicated at 38'. An adjustable counterweight 39 is disposed opposite to the inductor element in this instance to counterbalance the weight of the inductor.

Figure 4:
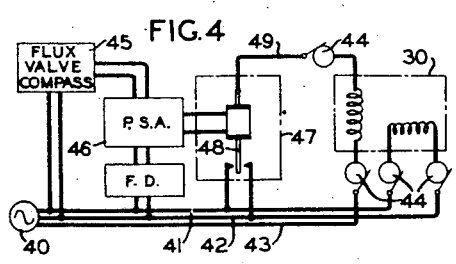
Fig. 4 is a schematic circuit diagram illustrating an electrical arrangement for controlling the torque exerting means of the invention when the stator or coil member thereof is formed of the two phase wound type.

In the form of the invention illustrated in Fig. 4, the coil member is shown as wound in two phase fashion and is energized from a suitable source of alternating current electrical energy as indicated at 40 by way of leads 41, 42 and 43 through the slip rings 44. The controller for the gyro instrument is schematically represented as a flux valve compass 45 and the system in which the same is employed is generally of the character disclosed in Patent No. 2,393,974, dated February 5, 1946, and issued in the name of one of the inventors of the present subject matter.

In the adaptation of this system with the disclosed means for exerting a torque about the axis of the rotor bearing case of the gyro instrument, the output of phase sensitive amplifier 46 is effective to operate a conventional polarized relay 47 and selectively position the contact closing armature arm 48 thereof. As shown in Fig. 4, one of the windings of the two phase wound type coil member 30 is continuously energized by way of leads 41 and 42 and the other winding is selectively energized through the relay 47 by way of either leads 41 and 43 or leads 42 and 43. Such a circuit is closed by the arm 48 and is effective by way of lead 49.

It will be understood that the torque exerting means is effective to cause movement of the inductor element 31 about the axis 34, Fig. 2, and position the vertical ring 13 so that the indication obtained from the gyro instrument corresponds to the azimuthal position in the earth's magnetic field of the controller or flux valve compass 45 employed in the present instance.

Figure 5:
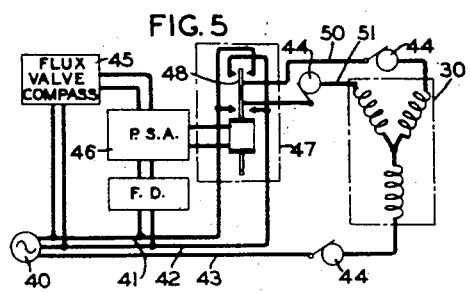
Fig. 5 is a view similar to Fig. 4, in which the coil member is three phase wound.

In Fig. 5, a similar controlling system for the gyro instrument is shown in which the coil member 30 is wound in three phase fashion and the relay 47 employed in this instance includes a double contact type of armature arm which is operative to reverse two of the windings of the coil member with respect to the energy supplying leads 41 and 42 upon reception of a signal from the phase sensitive amplifier 46 by the relay 47. This selectively controls the direction of movement of the magnetic field produced by the coil member 30 and consequently determines the direction that the inductor element 31 and the rotor bearing case are moved about their common axis. Such control is effected by way of relay armature including leads 50 and 51.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a gyroscopic instrument with a pivotally mounted ring movable about a first axis and a rotor bearing frame pivotally mounted on the ring movable about a second axis normal to the first axis; a motor for exerting a torque about one of the axes whose force components about the other of the axes balance each other including a polyphase wound stator and an inductor rotor, said stator and rotor being mounted one on the ring and one to move with the rotor bearing frame with movement thereof about the second axis, the rotor extending radially of the second axis and the stator comprising pole pieces extending substantially parallel to the second axis in mutually facing relation on opposite sides of said rotor.

2. In a gyroscopic instrument with a pivotally mounted ring movable about a vertical axis and a rotor bearing frame pivotally mounted on the ring movable about a horizontal axis; a motor for exerting a torque about the horizontal axis whose force components about the vertical axis balance each other including a polyphase wound stator and an inductor rotor, said rotor being mounted on said rotor bearing frame in radially extending relation to the horizontal axis thereof, and said stator being mounted on the ring and comprising pole pieces extending substantially parallel to the horizontal axis of the frame in mutually facing relation on opposite sides of said rotor.

3. An instrument as claimed in claim 2, in which the rotor comprises a thin vane-like inductor extending between the pole pieces of the stator.

4. An instrument as claimed in claim 2, in which the stator is of arcuate generally semi-cylindrical form.

5. In a gyroscopic instrument with a ring having a vertical axis and a rotor bearing frame mounted on the ring to pivot about a horizontal axis; a torque motor effective about the horizontal axis whose force components about the vertical axis of the frame balance each other including a polyphase wound stator and an inductor rotor, said stator comprising spaced pole pieces facing each other to define a slot therebetween and being mounted on the ring with said pole pieces substantially equally spaced on opposite sides of the vertical axis, and said rotor being mounted on the rotor bearing frame and extending within said slot.

ROBERT S. CURRY, Jr.
ORLAND E. ESVAL.

REFERENCES CITED

The following references are of record in the file of this patent:

UNITED STATES PATENTS

| Number | Name | Date |
|---|---|---|
| 1,136,566 | Usener | Apr. 20, 1915 |
| 2,270,876 | Esval et al. | Jan. 27, 1942 |
| 2,293,039 | Esval | Aug. 18, 1942 |
| 1,897,184 | Zopp | Feb. 14, 1933 |

FOREIGN PATENTS

| Number | Country | Date |
|---|---|---|
| 102,197 | Swedish | May 29, 1941 |